(12) United States Patent
Honzumi

(10) Patent No.: US 10,289,851 B2
(45) Date of Patent: *May 14, 2019

(54) SEMICONDUCTOR DEVICE AND ACCESS RESTRICTION METHOD

(71) Applicant: Renesas Electronics Corporation, Tokyo (JP)

(72) Inventor: Takashi Honzumi, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 15/491,770

(22) Filed: Apr. 19, 2017

(65) Prior Publication Data

US 2017/0220821 A1 Aug. 3, 2017

Related U.S. Application Data

(63) Continuation of application No. 14/080,803, filed on Nov. 15, 2013, now Pat. No. 9,697,364.

(30) Foreign Application Priority Data

Nov. 30, 2012 (JP) ................................ 2012-262129

(51) Int. Cl.
*G06F 21/60* (2013.01)
*G06F 21/62* (2013.01)
(Continued)

(52) U.S. Cl.
CPC ............ *G06F 21/60* (2013.01); *G06F 21/629* (2013.01); *G06F 21/79* (2013.01); *G06F 21/85* (2013.01);
(Continued)

(58) Field of Classification Search
CPC ........ G06F 21/60; G06F 21/629; G06F 21/79; G06F 21/85; G06F 11/1417;
(Continued)

(56) References Cited

U.S. PATENT DOCUMENTS

2003/0149914 A1 8/2003 Kim
2006/0143514 A1* 6/2006 Largman ............. G06F 11/1417
714/13

(Continued)

FOREIGN PATENT DOCUMENTS

JP 2004-280559 A 10/2004
JP 3591229 B2 11/2004
JP 2006-236057 A 9/2006

OTHER PUBLICATIONS

Office Action, dated Apr. 21, 2017, in Chinese Application No. 201310629475.2.
(Continued)

*Primary Examiner* — Noura Zoubair
(74) *Attorney, Agent, or Firm* — Shapiro, Gabor and Rosenberger, PLLC

(57) ABSTRACT

The present invention prevents unauthorized functions from being installed to a predetermined storage unit in the background through a communication function that is being used for authorized communication operations and further prevents confidential information from being read out and stolen from the predetermined storage unit. A semiconductor device adopts an exclusive control unit that exclusively controls communication performed by a communication unit capable of communicating with the outside and access to a predetermined storage unit. For example, the communication status of the communication unit is determined based on whether a communication clock is active or inactive, and the exclusive control is exercised based on the determination result.

18 Claims, 9 Drawing Sheets

(51) Int. Cl.
 *G06F 21/79* (2013.01)
 *G06F 21/85* (2013.01)
 *H04L 29/06* (2006.01)

(52) U.S. Cl.
 CPC ...... *H04L 63/10* (2013.01); *G06F 2221/2101* (2013.01)

(58) Field of Classification Search
 CPC ............ G06F 11/1451; G06F 11/1456; G06F 11/1469; H04L 63/10
 See application file for complete search history.

(56) References Cited

U.S. PATENT DOCUMENTS

2006/0195709 A1  8/2006  Matsumoto
2009/0290582 A1* 11/2009  Suenaga ................ H04L 25/14
                                      370/389

OTHER PUBLICATIONS

Office Action, dated Jul. 28, 2016, in Japanese Application No. 2012-262129.

* cited by examiner

SEMICONDUCTOR DEVICE AND ACCESS RESTRICTION METHOD

CROSS-REFERENCE TO RELATED APPLICATIONS

The disclosure of Japanese Patent Application No. 2012-262129 filed on Nov. 30, 2012 including the specification, drawings and abstract is incorporated herein by reference in its entirety.

BACKGROUND (1) Field of the Invention

The present invention relates to access restriction technology to prevent unauthorized access to a storage unit through a communication unit that communicates with an external communication network, which is a communication network connecting subscribers, such as telephones and data communications. For example, the present invention relates to an effective access control technology applicable to a microcomputer equipped with a communication function.

(2) Description of the Related Art

Japanese Patent No. 3591229 (Patent Literature 1) describes a system that includes a base station device and a terminal device coupled to the base station device through a communication function and performs maintenance on software of the terminal device with software downloaded from the base station device to the terminal device. This software maintenance means, in most cases, rewriting of programs or data stored in a nonvolatile storage area in the terminal device.

For the purpose of dispensing with additional memory used only to save communication subroutines transferred from a nonvolatile memory where firmware is stored in an apparatus like an electronic camera (cost reduction), and also circumventing the need to rewrite the firmware concurrently with reception of rewrite data (hang-up prevention due to a communication failure), the technology described in Japanese Unexamined Patent Application Publication No. 2004-280559 (Patent Literature 2) adopts a firmware rewrite control unit. The firmware rewrite control unit first stores firmware rewrite data transmitted from an external apparatus, such as a PC, in a first memory in the apparatus and then when the end of communication between a data rewrite device and the external apparatus is detected, rewrites the firmware stored in a second memory with the firmware rewrite data in the first memory. Internal data transfer and rewrite control sequences performed by the firmware rewrite control unit can be implemented by either programs or hardware logic.

SUMMARY

In the system as typified by Patent Literature 1, the terminal device can receive maintenance, such as operational improvement and fault rectification, by rewriting the software of the terminal device. However, at the same time, there is a risk of unauthorized functions being installed via the communication function due to malicious software, so-called computer viruses and malware. Although especially Patent Literature 1 is characterized as performing automatic background communication between the terminal device and base station, the communications may be also used to download the unauthorized functions. This downloading may be very difficult for users to notice beforehand. Patent Literature 1 also describes a user's operation to authorize installation, but it cannot be an effective measure if malicious software circumvents the installation authorization operation. Similarly, other measures like "adding specific authentication information to rewrite data" and "guiding users to click an acceptance button before rewriting" are merely measures performed by software and cannot be fundamental solutions because malicious software may be able to avoid these measures.

On the other hand, the firmware rewrite control unit described in Patent Literature 2 is configured to start writing after detecting the end of communication with the external apparatus; however, its aim is to avoid conflict between communication operation and rewrite operation to shorten communication time and to reduce the possibility that the PC hangs up due to communication failure, which is different from the aim of avoiding the risk of unauthorized functions installed via the communication function. In addition, the firmware to be rewritten is mounted on an apparatus, such as a camera, coupled to a PC, but not on a terminal device capable of communicating with a communication network if needed.

The above-described and other problems and novel features of the present invention will become apparent from the following description in the present specification and the accompanying drawings.

A typical embodiment disclosed in this application will be briefly described below.

In short, a semiconductor device adopts an exclusive control unit that exclusively controls communication, which is performed by a communication unit capable of communicating with the outside, and access to a predetermined storage unit. For example, the communication state of the communication unit is determined based on whether a communication clock is active or inactive, and the exclusive control is exercised based on the determination result.

Effects produced by the typical embodiment disclosed in the present application will be briefly described below.

Exclusively controlled communication by the communication unit and access to the predetermined storage unit can prevent unauthorized functions from being installed in the predetermined storage unit in the background through a communication function that is being used for authorized communication operations and further can prevent confidential information from being read out and stolen from the predetermined storage unit.

DETAILED DESCRIPTION

1. General Outline of Embodiments

Figure 1:
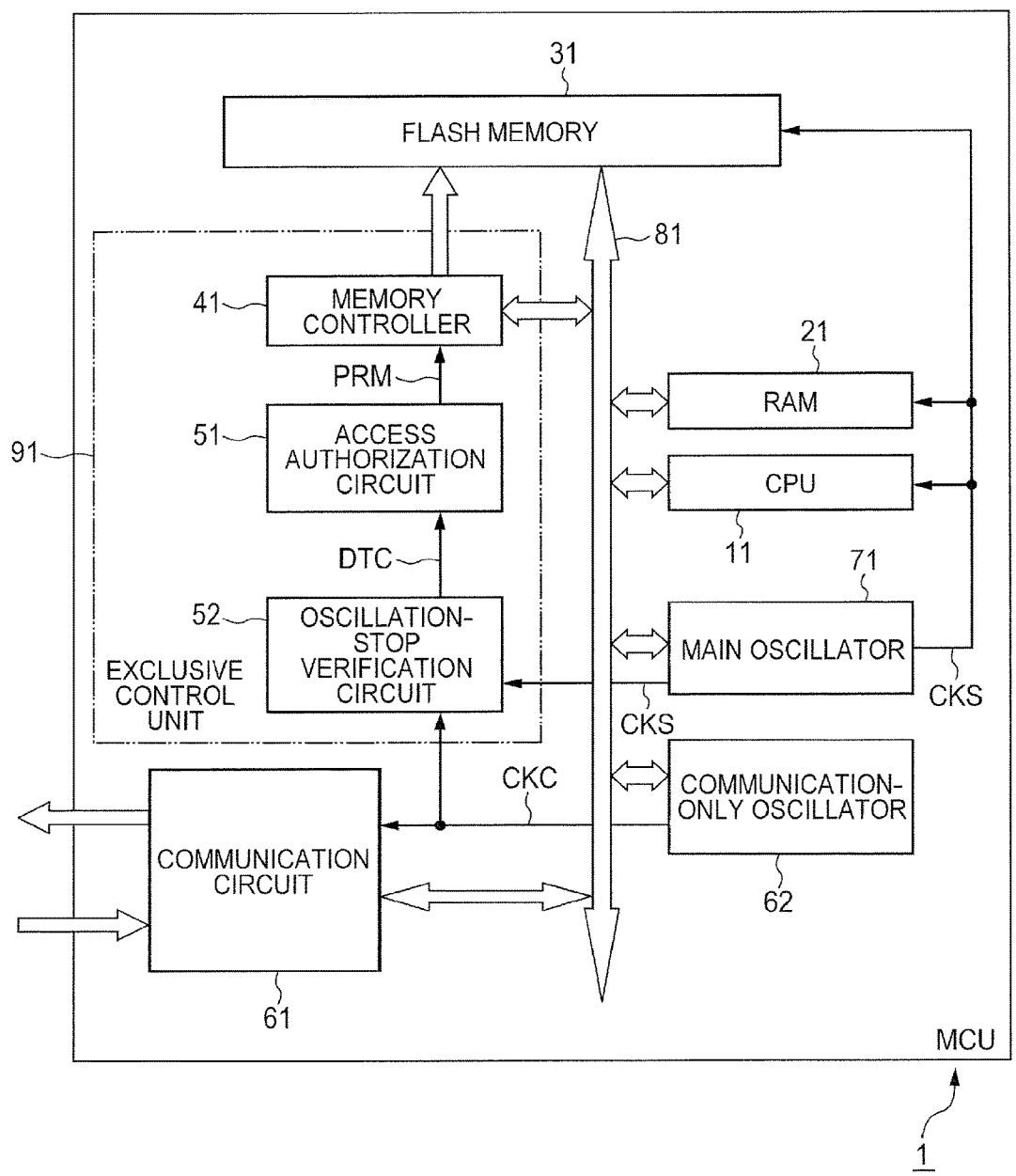
FIG. 1 is a block diagram illustrating the schematic configuration of a microcomputer, which is an example of a semiconductor device.

To begin with, embodiments of the present invention disclosed herein are outlined. In the following general description of embodiments, reference designators (numerals) in the drawings, which are given for referential purposes in parentheses, are only illustrative of elements that fall in the concepts of the components identified by the designators.

[1] <Exclusive Control on Communication and Access to Memory>

A semiconductor device (1, 1A) includes a communication unit (61) capable of communicating with the outside, a predetermined storage unit (31, 21), and an exclusive control unit (91, 92) exclusively controlling communication by the communication unit and access to the predetermined storage unit.

According to this configuration, communication by the communication unit and access to the predetermined storage unit are exclusively controlled, thereby preventing unauthorized functions from being installed to the predetermined storage unit in the background through a communication function that is being used for authorized communication operations and further preventing confidential information from being read out and stolen from the predetermined storage unit.

[2] <Exclusive Control Using Communication Clock>

In the section under [1], the exclusive control unit includes a detection circuit (51, 52) that detects the state of a communication clock (CKC) used by the communication unit to perform communication. The exclusive control unit restricts access to the predetermined storage unit when the detection circuit detects that the communication clock for the communication unit is in an active state, while removing the access restriction on the predetermined storage unit when the detection circuit detects that the communication clock for the communication unit is in an inactive state.

According to this configuration, exclusive control is exercised based on the state of hardware, i.e., the active/inactive state of the communication clock, detected by the detection circuit, which works as reinforcement of software measures against unauthorized access during communications.

[3] <Determination of Oscillation or Stoppage of Oscillation of Communication Clock>

In the section under [2], the semiconductor device includes a communication clock generation unit (62) that generates communication clocks to be used by the communication unit to perform communications. The exclusive control unit (91, 92) includes a detection circuit (51, 52) that detects the state of a communication clock (CKC) for the communication unit. The exclusive control unit removes access restriction on the predetermined storage unit when the detection circuit detects stoppage of communication clock oscillation, while restricting access to the predetermined storage unit when the detection circuit detects resumption of communication clock oscillation.

According to the configuration in which the semiconductor device includes the communication clock generation unit, exclusive control is exercised based on the state of hardware, i.e., the oscillation/stoppage of oscillation of the communication clock generated by the clock generation circuit, which works as reinforcement of software measures against unauthorized access during communications.

[4] <Communication Clock Regulating Communication Rate>

In the section under [2] or [3], the communication clock is a clock signal (CKC) regulating the communication rate.

According to this configuration, detection of whether the communication clock CKC, which regulates the communication rate, has stopped oscillating or resumed oscillating can be made with high precision for a short time, thereby preventing error detection of the communication clocks and readily ensuring the reliability of exclusive control over communication and access.

[5] <Write Protection During Communication>

In the section under [1], access restriction on the predetermined storage unit (31) is to protect the predetermined storage unit from write operation, and the semiconductor device includes, in addition to the predetermined storage unit, a temporary storage unit that temporarily stores data downloaded by the communication unit.

According to the configuration, while the communication unit is downloading data into the temporary storage unit through a communication function, unauthorized programs cannot be installed in the predetermined storage unit in the background via the communication function. The communication operation by the communication unit is disabled when the program or the like downloaded to the temporary storage unit is written to the predetermined storage unit, thereby suppressing the unauthorized programs or data from breaking into the predetermined storage unit from the communication unit during the write operation and suppressing the unauthorized programs and data to be stored together with or replaced with programs or data in the predetermined storage unit. Even if an unauthorized program undesirably breaks into the temporary storage unit and tries to perform a so-called backdoor operation, introducing unauthorized programs or data from the communication unit with authorized write operation performed on the predetermined storage unit and writing the unauthorized programs or data in the predetermined storage unit, such backdoor operation is blocked. Specifically, damage caused by the undesired backdoor operation can be prevented from spreading during communications. More specifically, even if, while the communication unit is downloading programs or data into the temporary storage unit, unauthorized programs or the like break into the temporary storage unit in the background via the communication function, it will be easier to prevent the unauthorized programs in the temporary storage unit from being stored in the predetermined storage unit. This is because two steps, downloading and writing to the predetermined storage unit, can afford the time to make a data check, such as hash, or other protective measures.

[6] <Read Protection During Communication>

In the section under [1], access restriction on the predetermined storage unit is to protect the predetermined storage unit (31) from read operation.

According to the configuration, during the read operation on the predetermined storage unit, the communication unit is disabled to perform communication operation concurrent with the read operation. Even if confidential information is read out from the predetermined storage unit, the disabled communication unit does not allow the confidential information to undesirably leak as it is from the communication unit to the outside.

[7] <Nonvolatile Memory>

In the section under [5] or [6], the predetermined storage unit is an electrically rewritable nonvolatile memory (31).

In the case of a volatile memory, it is difficult for unauthorized programs or the like, which have broken into the volatile memory, to pervasively affect the whole system, because the unauthorized programs are deleted by resetting the system or clearing the memory. On the other hand, once unauthorized programs or the like break into a nonvolatile memory, cumulative spread of the damage by the unauthorized programs may be easy. In this respect, the use of rewritable nonvolatile memory as an object to be restricted from access is of great significance.

[8] <Memory Controller>

In the section under [5] or [6], the exclusive control unit (91) includes a memory controller (41) that performs memory interface control on the predetermined storage unit in response to an access request and a detection circuit (51, 52) that detects the state of the communication clock. The detection circuit (51, 52) allows the memory controller to perform memory interface operations when detecting stoppage of communication clock oscillation, while disallowing the memory controller to perform memory interface operations under the access restriction when detecting oscillation of the communication clock.

According to the configuration, the memory controller can be used to achieve exclusive control.

[9] <Memory Management Unit>

In the section under [5] or [6], the exclusive control unit (92) includes a memory management unit (42) that has a memory protection function for mapped addresses of the predetermined storage unit and a detection circuit (51, 52) that detects the state of a communication clock. The detection circuit (51, 52) allows the memory management unit to translate an address mapped to the predetermined storage unit when detecting stoppage of communication clock oscillation, while disallowing the memory management unit to translate the address mapped to the predetermined storage unit under the access restriction when detecting oscillation of the communication clock.

According to the configuration, the memory management unit can be used to achieve exclusive control.

[10] <Access Restriction Method Using Exclusive Control on Communication and Access to Memory>

An access restriction method exclusively controls communication by a communication unit capable of communicating with the outside and access to a predetermined storage unit by restricting access to the predetermined storage unit while the communication unit is in communication and removing the access restriction on the predetermined storage unit while the communication unit is out of communication.

According to this method, effects obtained in the section under [1] can be provided.

[11] <Exclusive Control Using Communication Clock>

In the section under [10], access to the predetermined storage unit (31, 32) is restricted when a detection circuit (51, 52) detects that a communication clock (CKC) used by the communication unit (61) to perform communication is in an active state, and access restriction on the predetermined storage unit is removed when the detection circuit detects that the communication clock is in an inactive state.

According to this configuration, effects obtained in the section under [2] can be provided.

[12] <Determination of Oscillation and Stoppage of Oscillation of Communication Clock>

In the section under [10], access restriction on the predetermined storage unit is removed when the detection circuit detects stoppage of communication clock oscillation, and access to the predetermined storage unit is restricted when the detection circuit detects resumption of communication clock oscillation, the communication clock being used by the communication unit to perform communication and being generated by a communication clock generation unit (62).

According to this configuration, effects obtained in the section under [3] can be provided.

[13] <Communication Clock Regulating Communication Rate>

In the section under [12], the communication clock is a clock signal (CKC) regulating the communication rate.

According to this configuration, effects obtained in the section under [4] can be provided.

[14] <Write Protection During Communication>

In the section under [10], the communication unit downloads data into a temporary storage unit while the predetermined storage unit (31) is protected from write operation under the access restriction, and the data is written in the predetermined storage unit after the write protection on the predetermined storage unit is removed.

According to this configuration, effects obtained in the section under [5] can be provided.

[15] <Read Protection During Communication>

In the section under [10], the predetermined storage unit (31, 21) is protected from read operation under the access restriction while the communication clock is oscillating and the predetermined storage unit is allowed to be read out while the communication clock stops oscillating.

According to this configuration, effects obtained in the section under [6] can be provided.

[16] <Nonvolatile Memory>

In the section under [14] or [15], the predetermined storage unit is an electrically rewritable nonvolatile memory (31).

According to this configuration, effects obtained in the section under [7] can be provided.

[17] <Access Restriction Control with Memory Controller>

In the section under [14] or [15], a memory controller (41), which performs memory interface control on the predetermined storage unit in response to an access request, is allowed to perform memory interface operations when the detection circuit detects stoppage of communication clock oscillation and is disallowed to perform memory interface operations under the access restriction when the detection circuit detects oscillation of the communication clock.

According to this configuration, effects obtained in the section under [8] can be provided.

[18] <Access Restriction Control with Memory Management Unit>

In the section under [14] or [15], a memory management unit (42), which has a memory protection function for mapped addresses of the predetermined storage unit, is allowed to translate an address mapped to the predetermined storage unit when the detection circuit detects stoppage of communication clock oscillation and is disallowed to translate the address mapped to the predetermined storage unit under the access restriction when the detection circuit detects oscillation of the communication clock.

According to this configuration, effects obtained in the section under [9] can be provided.

2. Detailed Descriptions of Embodiments

<1. Exclusive Control on Communication Operation and Memory Access Operation by Memory Controller>

FIG. 1 illustrates the schematic configuration of a microcomputer, which is an example of a semiconductor device. The microcomputer (MCU) 1 shown in FIG. 1, although not restrictive, is formed on a single semiconductor substrate, such as a mono-crystalline silicon, by a CMOS semiconductor integrated circuit fabrication technology.

The microcomputer 1 includes a CPU (central processing unit) 11, a RAM (Random Access Memory) 21, a flash memory 31, a memory controller 41, an access authorization circuit 51, an oscillation-stop verification circuit 52, a communication circuit 61, a communication-only oscillator 62, a main oscillator 71, an internal bus 81, and an interrupt controller (not shown). The CPU 11 has access to the RAM 21, flash memory 31, memory controller 41, and communication circuit 61 via the internal bus 81.

The CPU 11 includes an instruction control unit that decodes instructions fetched and controls the instruction execution and an execution unit that performs computations under control of the instruction control unit. With the units, the CPU 11 runs programs described with a predetermined instruction set.

The RAM 21 is a volatile memory used as a work area of the CPU 11 or a temporary data storage area, and, for example, may be an SRAM.

The communication circuit 61 is capable of communicating with the outside of the microcomputer 1 and includes an external interface function in conformity with a communication mode, for example, a universal serial bus, a serial communication interface, an IIC (Inter Integrated Circuit) bus interface, and a serial peripheral interface. Clocks used for communication by the communication circuit 61, or more specifically, highly-precise clock signals (communication clock) CKC used to regulate the communication rate are generated by the communication-only oscillator 62. The main oscillator 71 generates clock signals other than the communication clocks CKC. For example, the main oscillator 71 generates reference clock signals CKS used for internal synchronization to feed the signals to clock synchronization circuits in the microcomputer 1. The communication-only oscillator 62 and main oscillator 71 start oscillating with the activation of a power-on reset of the microcomputer 1. The communication-only oscillator 62 can be controlled by the CPU 11 to stop and resume oscillation. The CPU 11 sets communication conditions of the communication circuit 61 and instructs the communication circuit 61 to enable transmission, whereas received data is left to the CPU 11 to handle it as an interrupt service, for example, in response to a reception interrupt request transmitted to the interrupt controller (not shown).

The flash memory 31 is an example of a nonvolatile storage unit that stores programs, which are executed by the CPU 11, and data in a rewritable manner and employs a storage format in which the threshold voltage is determined in accordance with the amount of electrons trapped in a charge storage area of a nonvolatile storage device.

The memory controller 41 performs memory control to read out and rewrite information stored in the flash memory 31 in response to an access request to the flash memory 31 from the CPU 11. Memory control for reading information includes controls for amplifying information read out from a selected nonvolatile storage device to acquire it. Memory control for rewriting information includes program processing and erase processing. In erase processing, for instance, the memory controller 41 applies an erasing voltage to a target nonvolatile storage device to bring the device into an erased state in which the threshold voltage is low, and performs timing control. In program processing, the memory controller 41 applies a writing voltage to the target nonvolatile storage device to bring the device into a written state in which the threshold voltage is high, and performs timing control. In addition, the memory controller 41 implements an exclusive control unit 91 with the access authorization circuit 51 and oscillation-stop verification circuit 52. The exclusive control unit 91 herein is regarded as an example that achieves an exclusive control function on communication by the communication circuit 61 and access to the flash memory 31. The exclusive control by the exclusive control unit 91 will be described in detail below.

The oscillation-stop verification circuit 52 is a circuit for detecting the state of communication clocks CKC and determines whether a communication clock is in an active state or in an inactive state. Specifically speaking, the oscillation-stop verification circuit 52 detects if the communication clock CKC has stopped oscillating and if the communication clock CKC has resumed oscillating. For example, the oscillation-stop verification circuit 52 changes a detection signal DTC from high to low when detecting that oscillation has stopped, while changing the detection signal DTC from low to high when detecting the oscillation has resumed.

The access authorization circuit 51, although not restrictive, inverts an access permission signal PRM to enable the signal in response to a detection signal DTC indicative of stoppage of communication clock CKC oscillation and sends the enabled signal to the memory controller 41 to remove access restriction on the flash memory 31. Also, the access authorization circuit 51 inverts the access permission signal PRM to disable the signal in response to a detection signal DTC indicative of resumption of communication clock CKC oscillation and sends the disabled signal to the memory controller 41 to restrict the access to the flash memory 31.

When the CPU 11 issues an instruction to rewrite the flash memory 31, the memory controller 41 can perform rewrite operation on the flash memory 31 on the condition that the access permission signal PRM is enabled. If the access permission signal PRM is disabled when the rewrite instruction arrives, the memory controller 41 can wait until the access permission signal PRM becomes enabled and then perform the rewrite operation on the flash memory 31. If rewrite operation to the flash memory 31 starts with an enabled access permission signal PRM and then the access permission signal PRM becomes disabled in the middle of the rewrite operation, the rewrite operation is suspended in response to the disabled access permission signal. When the rewrite operation is suspended, for example, the memory controller 41 holds rewrite control information required to resume the rewrite operation from the middle, or, returns a write error to the CPU 11.

In addition, when the CPU 11 issues an instruction to read the flash memory 31, the memory controller 41 can perform read operation on the flash memory 31 on the condition that the access permission signal PRM is enabled. If the access permission signal PRM is disabled when the read instruction arrives, the memory controller 41 can wait until the access permission signal PRM becomes enabled and then perform the read operation on the flash memory 31. If read operation on the flash memory 31 starts with an enabled access permission signal PRM and then the access permission signal PRM becomes disabled in the middle of the read operation, the read operation is suspended in response to the disabled access permission signal. When the read operation is suspended, for example, the memory controller 41 holds readout control information required to resume the read operation from the middle, or, returns a readout error to the CPU 11.

Figure 2:
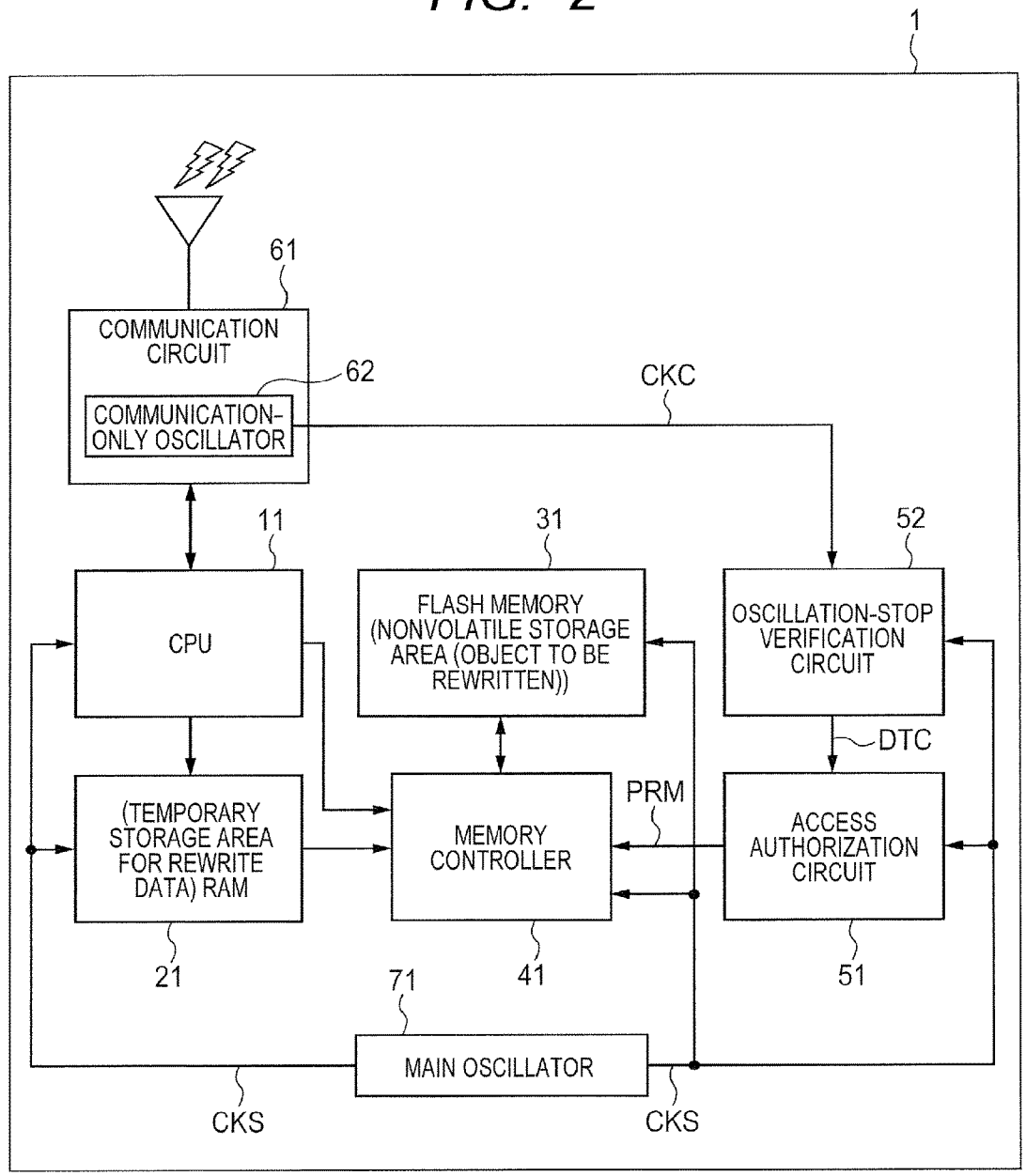
FIG. 2 illustrates the connectivity relationship of circuits when communication operation by a communication circuit and rewrite operation on a flash memory are exclusively controlled with a memory controller.

FIG. 2 illustrates the connectivity relationship of circuits when communication operation by the communication circuit 61 and rewrite operation on the flash memory 31 are exclusively controlled. The CPU 11 makes settings of the communication circuit 61 and stores rewrite data received by the communication circuit 61 in the RAM 21. The communication circuit 61 performs communication operations in synchronization with communication clocks CKC generated by the communication-only oscillator 62. When having detected a change in a communication clock CKC, the oscillation-stop verification circuit 52 changes a detection signal DTC to high and sends it to the access authorization circuit 51. The access authorization circuit 51 that has received the detection signal DTC disables an access permission signal PRM, thereby disallowing the memory controller 41 to control access to the flash memory 31. Therefore, it is impossible to directly write data downloaded by the communication circuit 61 to the flash memory 31.

The CPU 11 downloads rewrite data into the RAM 21, and then causes the communication-only oscillator 62 to stop oscillating. This stops the communication clock CKC from changing and thereby the detection signal DTC is changed to low. Upon reception of the detection signal DTC, the access authorization circuit 51 enables the access permission signal PRM to allow the memory controller 41 to control access to the flash memory 31. When the CPU 11 issues an instruction to rewrite the flash memory 31 with the rewrite data stored in the RAM 21, the memory controller 41 can rewrite the flash memory 31 by following the rewrite instruction. Since the communication clock CKC is in the stopped state while the flash memory 31 is being rewritten, the communication circuit 61 cannot establish communication. Even if the communication-only oscillator 62 resumes oscillation in the middle of the rewrite operation, the access permission signal PRM is inverted to be disabled at the moment and therefore the rewrite operation itself is suspended.

Figure 3:
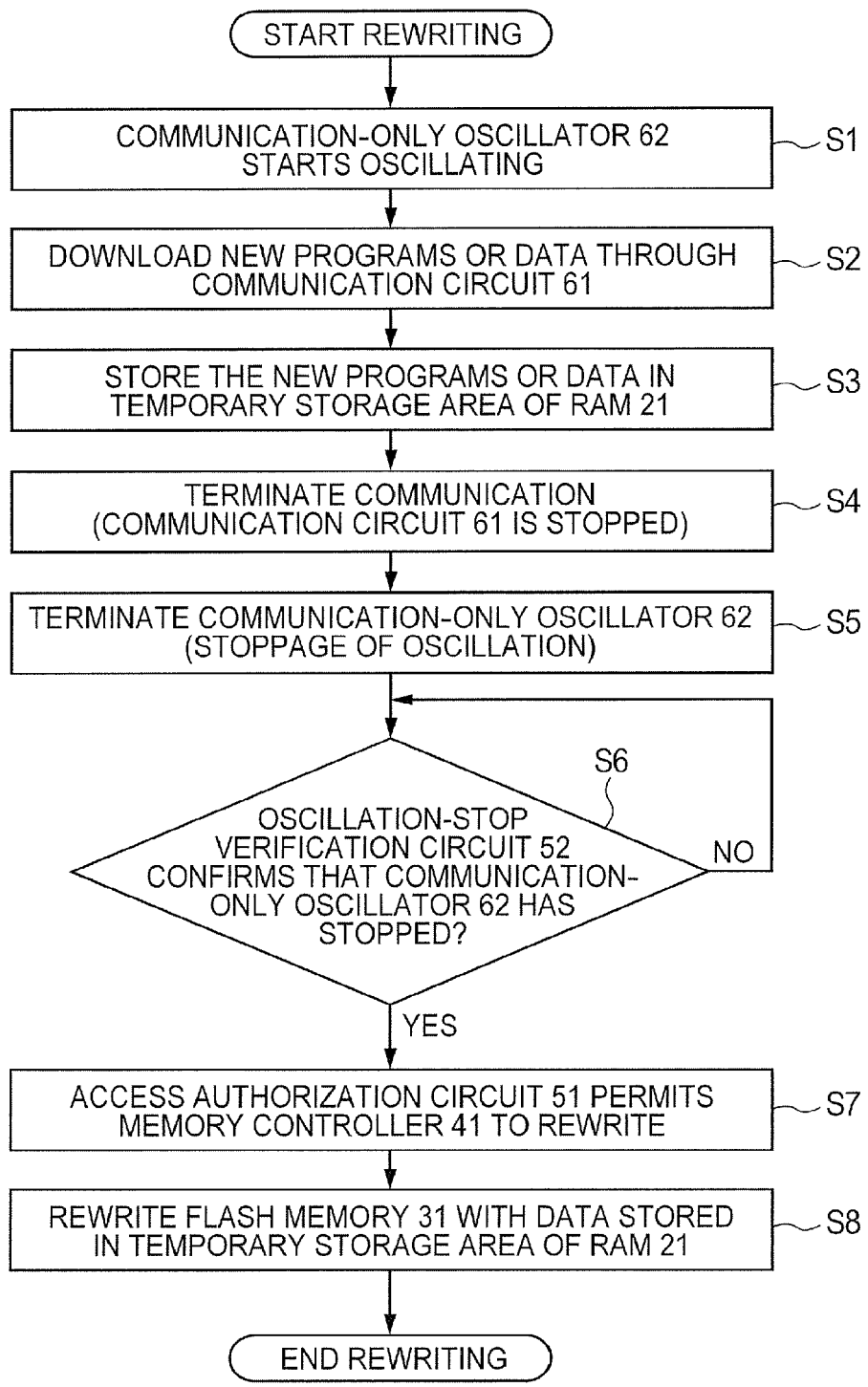
FIG. 3 is a flowchart illustrating a control procedure performed by a CPU to rewrite a flash memory.

FIG. 3 illustrates a control procedure when the CPU 11 rewrites the flash memory 31. In a case where the CPU 11 downloads rewrite data from the outside to rewrite the flash memory 31 with the rewrite data, the CPU 11 firstly causes the communication-only oscillator 62 to start oscillating (S1), downloads rewrite data, such as new programs or data, through the communication circuit 61 (S2), and then stores the rewrite data in a temporary storage area of the RAM 21 (S3). Once receiving notification that the communication circuit 61 has completed receiving operations with an interrupt request, the CPU 11 causes the communication circuit 61 to stop (S4) and stops the communication-only oscillator 62 from oscillating (S5).

When the oscillation-stop verification circuit 52 confirms that the communication clock CKC has stopped (S6), the access authorization circuit 51 permits the memory controller 41 to rewrite (S7). Thus, the memory controller 41 controls rewrite operation to be performed on the flash memory 31 with the rewrite data downloaded in the RAM 21 based on the rewrite request from the CPU 11 (S8).

The exclusive control over the communication operation and rewrite operation on the flash memory provides the following effects.

(1) The communication operation by the communication circuit 61 and the rewrite operation on the flash memory 31 by the memory controller 41 are exclusively controlled based on the hardware state, i.e., the active/inactive state of the communication clock CKC confirmed by the oscillation-stop verification circuit 52, thereby reinforcing measures by software (e.g., data size verification, hash verification, etc.) against unauthorized access during communication.

(2) Detection of whether the communication clock CKC, which regulates the communication rate, has stopped oscillating or resumed oscillating can be made with high precision for a short time, thereby preventing error detection of the communication clock and readily ensuring the reliability of exclusive control over communication and access. In order to achieve exclusive control over communication and rewriting, a method for reliably and readily determining the termination of communication needs to be achieved. In this embodiment, clocks, or the communication clocks CKC, are used to determine the communication status in view of the fact that the clocks are necessary to generate a baud rate in the communication function. General concerns in determining whether the clock has stopped or not include the length of determination time, determination error that occurs when the target clock is unstable, and so on. If, for example, a reference clock that is generated by an independent oscillator dedicated for determining stoppage of clocks is used to determine the clock status, it is required to detect whether the clock is inverted or not within a predetermined number of cycles of the reference clock. This is because some factors, such as cost, may not permit the reference clock from having excessively high precision. This embodiment solves the problems, including time constraints to detect stoppage of unstable clocks and deterioration in the detection precision, by using high-speed and highly-precise communication clocks CKC as clocks indispensable for communication. In other words, the present embodiment can detect that the communication operation has been terminated with ease and high precision by detecting stoppage of the communication clock, which is associated with hardware.

(3) Access restriction, more specifically, inhibiting rewrite operation on the flash memory 31 during communication can prevent unauthorized programs from being installed in the flash memory 31 in the background through the communication function that is being used by the communication circuit 61 to download programs or data into the RAM 21. The communication operation by the communication circuit 61 is disabled when a program or the like downloaded in the RAM 21 is written to the flash memory 31, thereby suppressing unauthorized programs or data from breaking into the flash memory 31 from the communication circuit 61 during the write operation and suppressing unauthorized programs or data to be stored together with or replaced with programs or data in the flash memory 31. Even if an unauthorized program undesirably breaks into the RAM 21 and acquires another unauthorized program or data through the communication circuit 61 to write the unauthorized program or data in the flash memory 31 while authorized write processing is being performed on the flash memory 31, which is a so-called backdoor, the attempt will be blocked. In short, damage caused by the undesired backdoor operations can be prevented from spreading during communication. In addition, even if an unauthorized program or the like breaks into the RAM 21 in the background through the communication function that is being used by the communication circuit 61 to download a program or data to the RAM 21, the two-step operation comprising of downloading and writing in the flash memory 31 can easily prevent the unauthorized program in the RAM 21 from being stored in the flash memory 31 because the two-step operation ensures sufficient time to take other protective measures including data check, such as hash verification.

Figure 4:
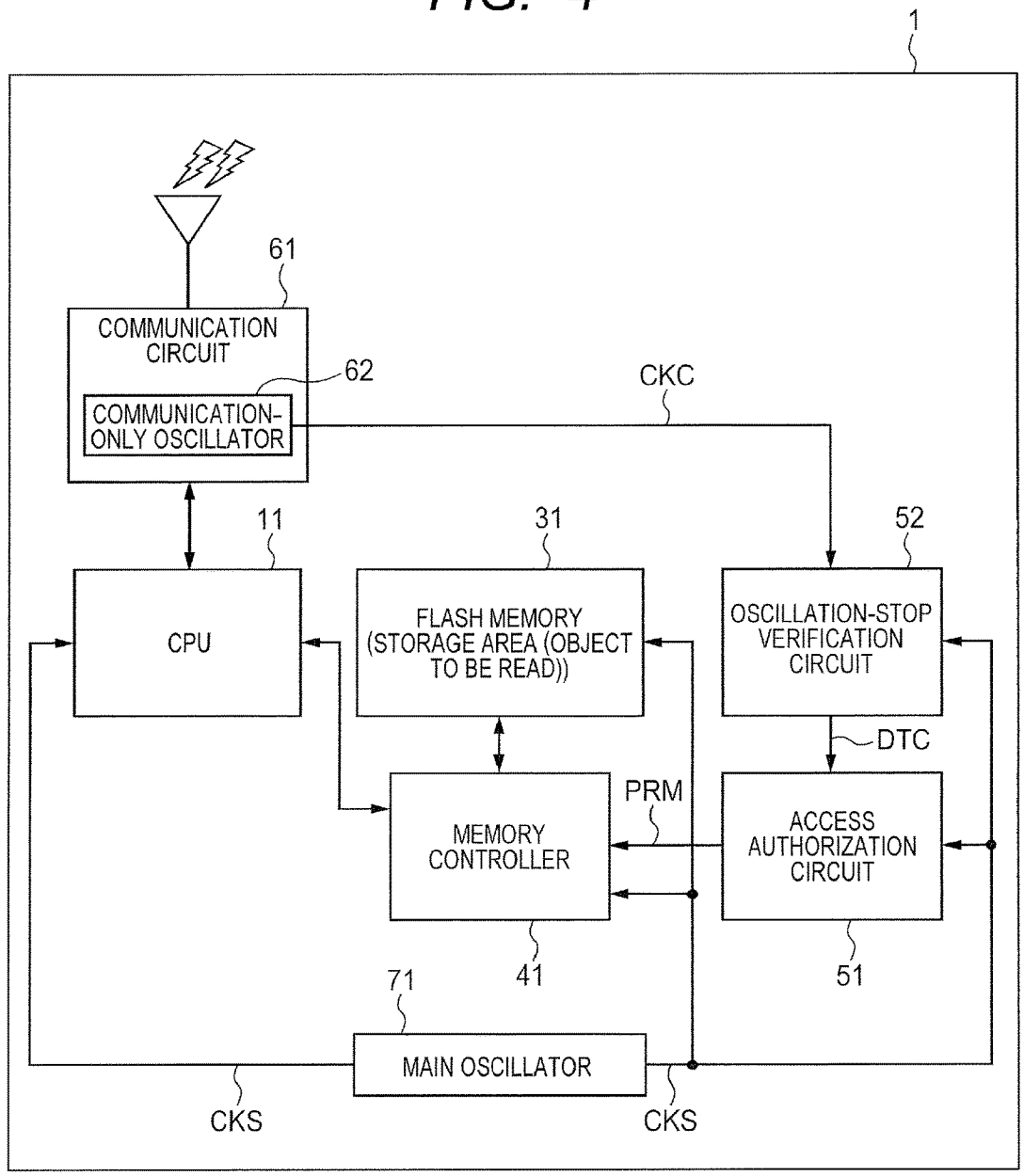
FIG. 4 illustrates the connectivity relationship of circuits when communication operation by a communication circuit and read operation on a flash memory are exclusively controlled with the memory controller.

FIG. 4 illustrates the connectivity relationship of circuits when communication operation by the communication circuit 61 and read operation on a flash memory 31 are exclusively controlled. Before reading data from the flash memory 31, the CPU 11 stops the communication-only oscillator 62 from oscillating in advance and then causes the oscillation-stop verification circuit 52 to detect the stopped state so as to enable a permission signal PRM. Through this step, the memory controller 41 can perform read operation on the flash memory 31 in response to an access request from the CPU 11 to read the flash memory 31. Since the communication clock CKC is stopped from oscillating during read operation on the flash memory 31, the communication circuit 61 cannot establish communication. Even if the communication-only oscillator 62 resumes oscillation in the middle of the read operation, the access permission signal PRM is inverted to be disabled at the moment and therefore the read operation itself is suspended.

Figure 5:
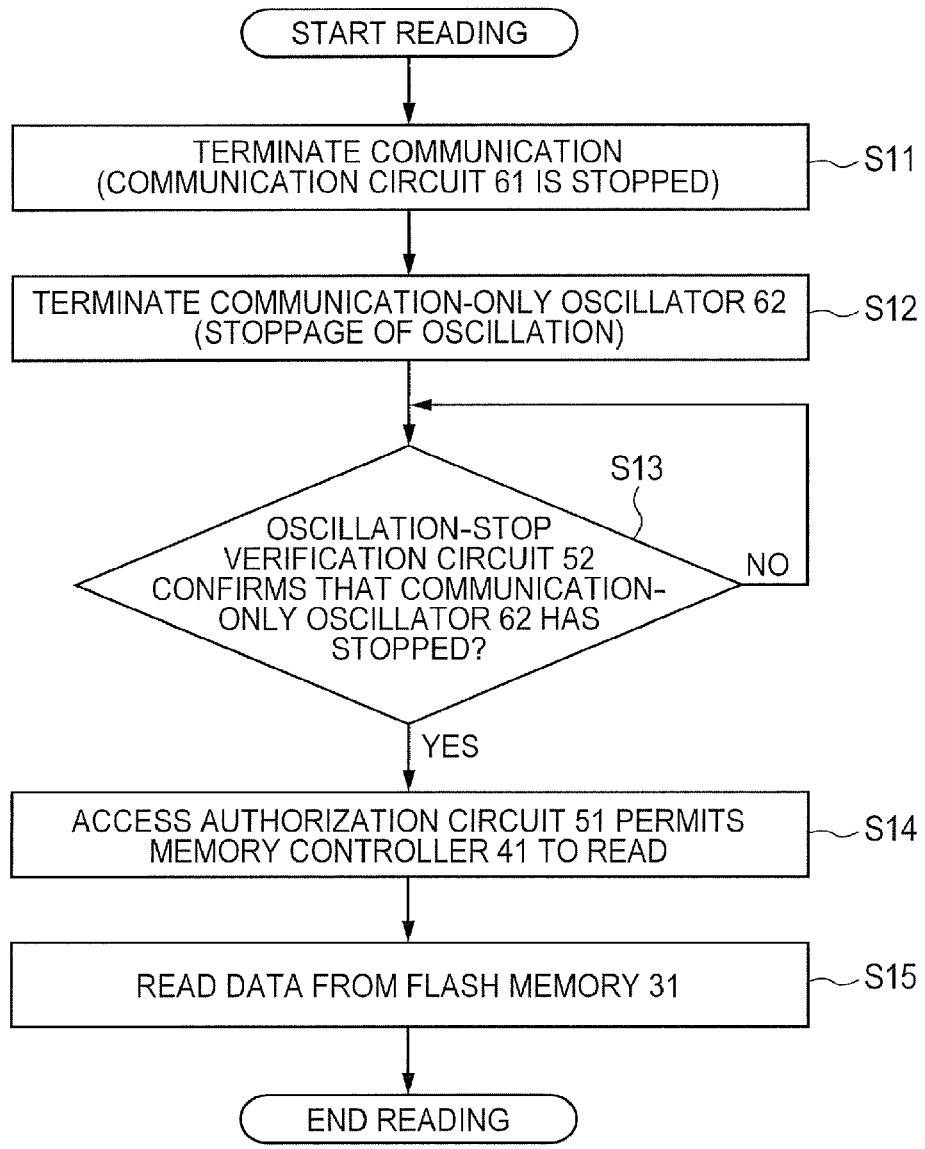
FIG. 5 is a flowchart illustrating a control procedure performed by a CPU to read a flash memory.

FIG. 5 illustrates a control procedure when the CPU 11 reads the flash memory 31. The CPU 11 terminates communication processing performed by the communication circuit 61 (S11) and stops the communication-only oscillator 62 from oscillating (S12). When the oscillation-stop verification circuit 52 confirms that the communication clock CKC has stopped (S13), the access authorization circuit 51 permits the memory controller 41 to read the flash memory 31 (S14). Through these steps, the memory controller 41 controls read operation on the flash memory 31 based on a read request from the CPU 11 (S15).

The exclusive control over the communication operation and read operation on the flash memory provides the following effects.

(1) During the read operation on the flash memory 31, the communication circuit 61 is disabled to perform the communication operation concurrent with the read operation. Even if confidential information (e.g., password, personal information, etc.) is read out from the flash memory 31, the disabled communication circuit 61 does not allow the confidential information to undesirably leak as it is from the communication circuit 61 to the outside.

(2) The communication operation by the communication circuit 61 and the read operation on the flash memory 31 by the memory controller 41 are exclusively controlled based on the hardware state, i.e., the active/inactive state of the communication clock CKC confirmed by the oscillation-stop verification circuit 52, thereby reinforcing measures by software against unauthorized access during communication.

<2. Exclusive Control on Communication Operation and Memory Access Operation by MMU>

Figure 6:
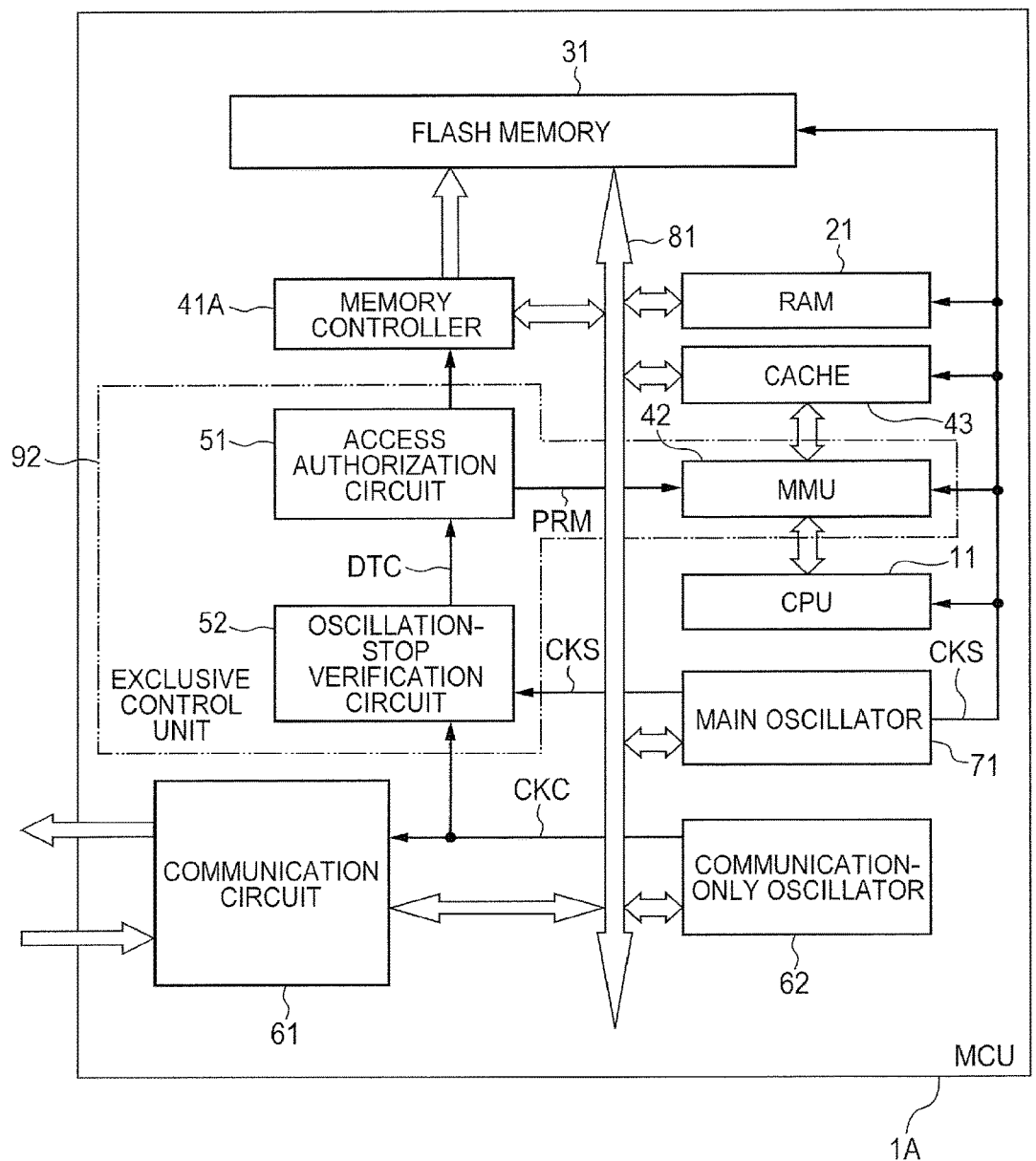
FIG. 6 is a block diagram illustrating the schematic configuration of a microcomputer, which is another example of the semiconductor device.

FIG. 6 illustrates the schematic configuration of a microcomputer, which is another example of a semiconductor device. The microcomputer (MCU) 1A shown in FIG. 6, although not restrictive, is formed on a single semiconductor substrate, such as a mono-crystalline silicon, by a CMOS semiconductor integrated circuit fabrication technology.

The microcomputer 1A of FIG. 6 employs a MMU (memory management unit) 42, which is a virtual memory, that translates a logical address output by the CPU 1 into a physical address. The translated physical address is output to a bus 81 to address a RAM 21, a flash memory 31 or the like to be accessed. Although not restrictive, a cache memory (CACHE) 43 is provided to store data about program information, data information and so on. The MMU 42 has translation pairs used to translate a logical address into a physical address, and the translation pairs include protection information used to protect memory. The protection information may be information used to specify the type of access rights required to access a given address (e.g., a user area accessible in a user mode, a privilege area accessible in a privilege mode, etc.), the type of access allowed by a given address (e.g., read, write, etc.), and so on. In the example of FIG. 6, the MMU 42 implements an exclusive control unit 92 with the access authorization circuit 51 and the oscillation-stop verification circuit 52. The exclusive control unit 92 herein is regarded as an example that achieves a function to exclusively control communication by the communication circuit 61 and access to the flash memory 31 or RAM 21. Therefore, the memory controller 41A does not have the configuration and functions unique to the exclusive control as described with FIG. 1, that is, an access restriction function performed based on access permission signals PRM. Circuit blocks and signals having the same functions as those shown in FIG. 1 are denoted with the same reference numerals and their detailed explanation will not be reiterated. The following is a detailed description about exclusive control by the exclusive control unit 92.

When the CPU 11 outputs a specific logical address allocated in the flash memory 31 or RAM 21, the MMU 42 translates the specific logical address into a physical address on the condition that a permission signal PRM is enabled. If the access permission signal PRM is disabled, an exception handling, such as address error, is requested to the CPU 11. In other words, translation of the specific logical address to a physical address is rejected while the communication-only oscillator 62 is oscillating, and consequently the CPU 11 is rejected to access to the flash memory 31 or RAM 21. When the communication-only oscillator 62 is not oscillating, the specific logical address is translated into a physical address, and consequently the CPU 11 is allowed to access the flash memory 31 or RAM 21.

In write operation and read operation on the specific logical address, the MMU 42 imposes/removes restriction of address translation depending on the enable/disable state of the access permission signal PRM.

Figure 7:
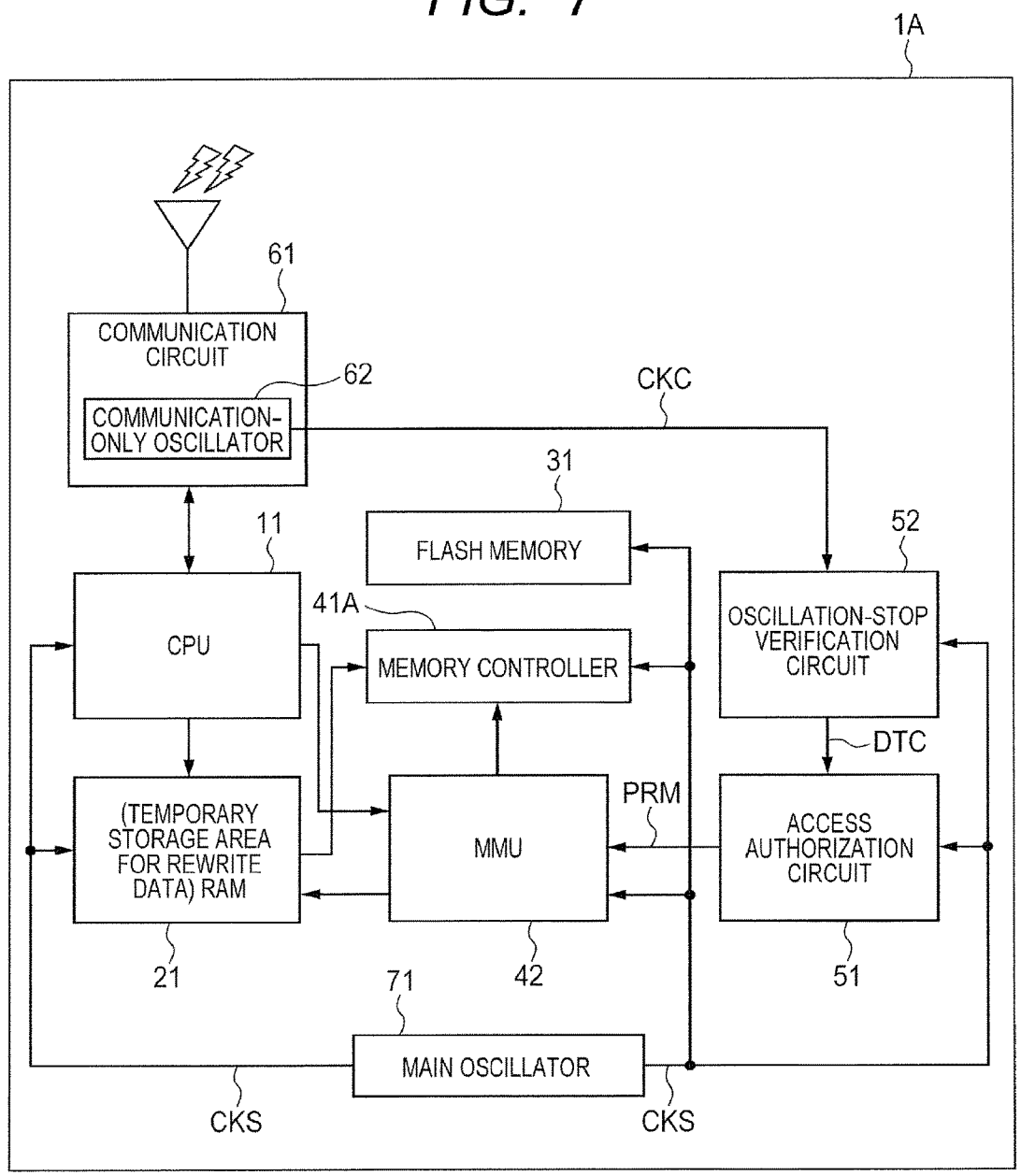
FIG. 7 illustrates the connectivity relationship of circuits when communication operation by a communication circuit and rewrite operation on a flash memory are exclusively controlled with an MMU.

FIG. 7 illustrates the connectivity relationship of circuits when communication operation by the communication circuit 61 and rewrite operation on the flash memory 31 are exclusively controlled. In this example, the specific logical address is supposed to be allocated in the flash memory 31.

The CPU 11 makes settings of the communication circuit 61 and stores rewrite data received by the communication circuit 61 into the RAM 21. The communication circuit 61 performs communication operation in synchronization with communication clocks CKC generated by the communication-only oscillator 62. When having detected a change in a communication clock CKC, the oscillation-stop verification circuit 52 changes a detection signal DTC to high and sends it to the access authorization circuit 51. The access authorization circuit 51 that has received the detection signal DTC disables an access permission signal PRM, thereby disallowing the MMU 42 to translate the logical address allocated in the flash memory 31. Consequently, the memory controller 41A cannot control access to the flash memory 31 while the communication circuit 61 is in communication operation. Therefore, it is impossible to directly write data downloaded by the communication circuit 61 to the flash memory 31.

The CPU 11 downloads rewrite data into the RAM 21, and then causes the communication-only oscillator 62 to stop oscillating. This stops the communication clock CKC from changing and thereby the detection signal DTC is changed to low. Upon reception of the detection signal DTC, the access authorization circuit 51 enables the access permission signal PRM to allow the MMU 42 to translate the logical address allocated in the flash memory 31. Thus, when the CPU 11 issues an instruction to rewrite the flash memory 31 with the rewrite data stored in the RAM 21, the memory controller 41A can rewrite the flash memory 31 by following the rewrite instruction. Since the communication clock CKC is in the stopped state while the flash memory 31 is being rewritten, the communication circuit 61 cannot establish communication. Even if the communication-only oscillator 62 resumes oscillation in the middle of the rewrite operation, the access permission signal PRM is inverted to be disabled at the moment, and therefore rewrite operation on the flash memory 31 at a new access address issued by the CPU 11 is inhibited as an address error.

The exclusive control by the MMU over the communication operation and rewrite operation on the flash memory 31 provides the following effects.

(1) While the communication circuit 61 is in communication, the communication operation by the communication circuit 61 and the rewrite operation on the flash memory 31 are exclusively controlled by action of access protection for the flash memory 31 performed by the MMU 42 based on the hardware state, i.e., the active/inactive state of the communication clock CKC confirmed by the oscillation-stop verification circuit 52, thereby reinforcing measures by software (e.g., data size verification, hash verification, etc.) against unauthorized access during communication.

(2) Detection of whether the communication clock CKC, which regulates the communication rate, has stopped oscillating or resumed oscillating can be made with high precision for a short time, thereby preventing error detection of the communication clock and readily ensuring the reliability of exclusive control over communication and access.

(3) Access restriction, more specifically, inhibiting rewrite operation on the flash memory 31 during communication, which is performed by the MMU 42, can prevent unauthorized programs from being installed in the flash memory 31 in the background through the communication function that is being used by the communication circuit 61 to download programs or data into the RAM 21. The communication operation by the communication circuit 61 is disabled when a program or the like downloaded in the RAM 21 is written to the flash memory 31, thereby suppressing unauthorized programs or data from breaking into the flash memory 31 from the communication circuit 61 during the write operation and suppressing unauthorized programs or data to be stored together with or replaced with programs or data in the flash memory 31. Even if an unauthorized program undesirably breaks into the RAM 21 and acquires another unauthorized program or data through the communication circuit 61 to write the unauthorized program or data in the flash memory 31 while authorized write processing is being performed on the flash memory 31, which is a so-called backdoor, the attempt will be blocked. In short, damage caused by the undesired backdoor operations can be prevented from spreading during communication.

Figure 8:
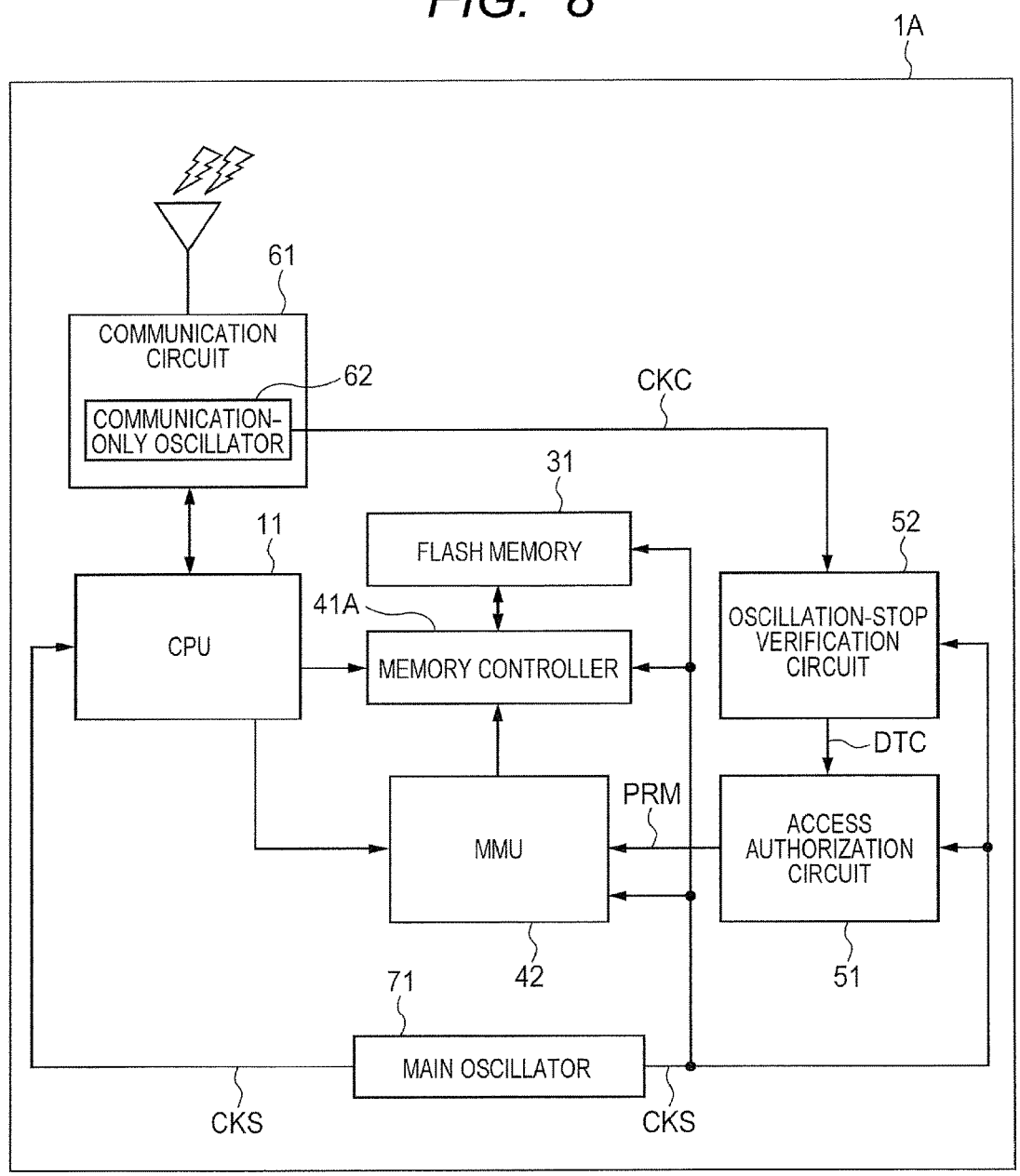
FIG. 8 illustrates the connectivity relationship of circuits when communication operation by a communication circuit and read operation on a flash memory are exclusively controlled with the MMU.

FIG. 8 illustrates the connectivity relationship of circuits when communication operation by the communication circuit 61 and read operation on a flash memory 31 are exclusively controlled. In this example, the specific logical address is supposed to be allocated in the flash memory 31.

Before reading data from the flash memory 31, the CPU 11 stops the communication-only oscillator 62 from oscillating in advance and then causes the oscillation-stop verification circuit 52 to detect the stopped state so as to enable a permission signal PRM. Through this step, the logical address allocated in the flash memory 31 can be translated by the MMU 42, and the memory controller 41A can perform read operation on the flash memory 31 with the translated physical address in response to an access instruction, which is issued by the CPU 11, to read the flash memory 31. Since the communication clock CKC is stopped from oscillating during read operation on the flash memory 31, the communication circuit 61 cannot establish communication. Even if the communication-only oscillator 62 resumes oscillation in the middle of the read operation, the access permission signal PRM is disabled at the moment, and therefore read operation on the flash memory 31 at a new access address issued by the CPU 11 is inhibited as an address error.

The exclusive control by the MMU 42 over the communication operation and read operation on the flash memory 31 provides the following effects.

(1) During the read operation on the flash memory 31, the communication circuit 61 is disabled to perform the communication operation concurrent with the read operation. Even if confidential information (e.g., password, personal information, etc.) is read out from the flash memory 31, the disabled communication circuit 61 does not allow the confidential information to undesirably leak as it is from the communication circuit 61 to the outside.

(2) While the communication circuit 61 is in communication, the communication operation by the communication circuit 61 and the read operation on the flash memory 31 are exclusively controlled by action of access protection for the flash memory 31 performed by the MMU 42 based on the hardware state, i.e., the active/inactive state of the communication clock CKC confirmed by the oscillation-stop verification circuit 52, thereby reinforcing measures by software (e.g., data size verification, hash verification, etc.) against unauthorized access during communication.

The last description is about exclusive control on communication operation and access operation on a memory by an MMU, where the memory is a RAM 21.

Figure 9:
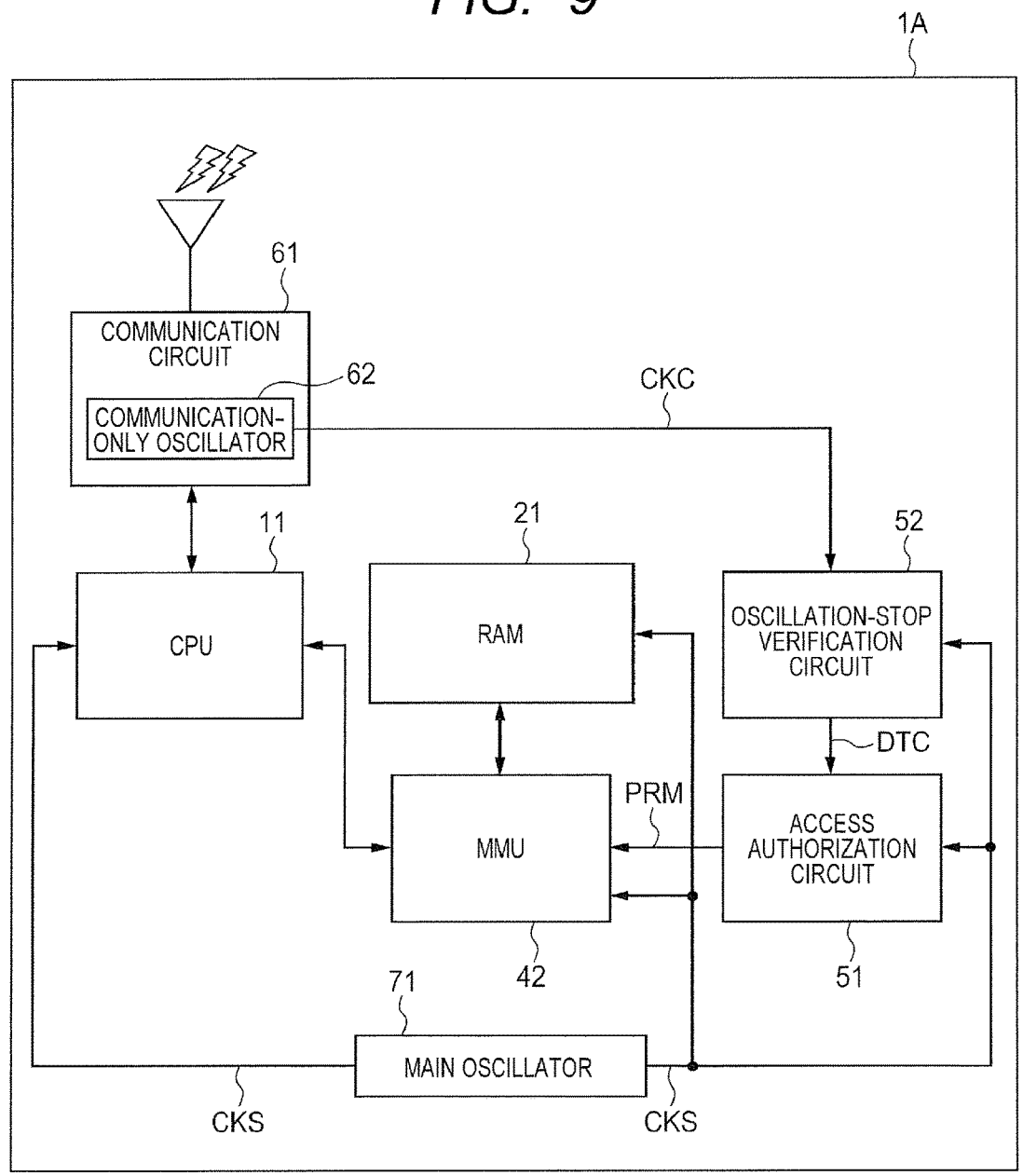
FIG. 9 illustrates the connectivity relationship of circuits when communication operation by a communication circuit and read operation on a RAM are exclusively controlled with the MMU.

FIG. 9 illustrates the connectivity relationship of circuits when communication operation by a communication circuit 61 and read operation on a RAM 21 are exclusively controlled. In this example, the memory protected by an MMU 42 with reference to a permission signal PRM is different from the one in FIG. 7 and FIG. 8. Specifically, the aforementioned specific logical address is supposed to be allocated in a RAM 21.

When the communication-only oscillator 62 is ocillating, the ocillation-stop verification circuit 52 detects the oscillation and disables the permission signal PRM. The MMU 42 issues an address error without translating a logical address allocated in the RAM 21 into a physical address, thereby disallowing the CPU 11 to access the RAM 21.

Before making access to the RAM 21, the CPU 11 stops the communication-only oscillator 62 from oscillating and then causes the oscillation-stop verification circuit 52 to detect the stopped state so as to enable the permission signal PRM. Through this step, the MMU 42 can translate the logical address allocated in the RAM 21, and consequently the CPU 11 can make access to the RAM 21 with the translated physical address. Since the communication clock CKC is in the stopped state while the CPU 11 accesses the RAM 21, the communication circuit 61 cannot establish communication. Even if the communication-only oscillator 62 resumes oscillation in the middle of the access to the RAM 21, the access permission signal PRM is disabled at the moment, and therefore access operation to a new access address in the RAM 21 issued by the CPU 11 results in an address error and the subsequence access attempts to the RAM 21 are inhibited.

The exclusive control by the MMU 42 on communication operation by the communication circuit 61 and read operation on the RAM 21 also provides the similar effects in the case of the flash memory 31. Especially, the exclusive control for protecting the RAM 21 prevents unauthorized programs or data from breaking into the RAM 21 from communication circuit 61, which functions as a precautionary measure against unauthorized write and read operations on the flash memory 31.

It should be understood that the invention is not limited to the foregoing embodiments and various changes and modifications may be made without departing from the spirit of the invention.

For example, the exclusive access control performed by confirming the oscillation state can be implemented by simply providing a function of restricting access, or rewriting, with detection of high-speed clocks, and therefore the present invention is not limited by the above-described embodiments. In one possible case, the exclusive control unit 91 shown in FIG. 1 can be replaced with a memory controller incapable of operating properly with high-speed communication clocks CKC, for example. Specifically, given that the object to be controlled by the memory controller is a flash memory, the memory controller is configured to work with a charge pump that generates high voltage used for rewriting and the charge pump is configured not to boost up voltage while high-speed synchronous clocks are input. The configuration makes it possible to perform write operation with the boosted voltage only while the communication clock is stopped and to omit the access authorization circuit so as to use detection signals DTC indicative of a non-oscillation state instead of access permission signals PRM.

The storage unit subjected to exclusive control is not limited to either one of the flash memory and RAM, and both the flash memory and RAM can be exclusively controlled. In addition, the flash memory may be a dielectric memory or other types of nonvolatile memory.

The communication unit is not limited to the aforementioned communication functions, such as a universal serial bus. For example, the communication unit may be a high-frequency interface unit coupled with an antenna. Although the exclusive control unit includes the MMU or the memory controller, the present invention is not limited thereto and may adopt hardware that physically blocks access paths.

What is claimed is:

1. A semiconductor device comprising:
    a communication unit configured for external communication;
    a communication oscillator that generates a clock signal used by the communication unit in performing the external communication;
    a central processing unit;
    a temporary storage unit that temporarily stores data downloaded by the communication unit;
    a predetermined storage unit; and
    an exclusive control unit that exclusively controls communication by the communication unit and access to the predetermined storage unit,
    wherein the exclusive control unit includes a detection circuit that detects an oscillation state of the communication oscillator via said clock signal,
    wherein the central processing unit is configured to send a signal to the communication oscillator to stop oscillation thereof prior to sending an instruction to perform read or write operation on the predetermined storage unit,
    wherein the exclusive control unit is configured to:
        restrict access to the predetermined storage unit in response to the detection circuit detecting oscillation of the communication oscillator, and
        allow access to the predetermined storage unit only when the detection circuit detects that the communication oscillator is not oscillating after the central processing unit sends said signal to stop oscillation,
    wherein the access restriction on the predetermined storage unit by the exclusive control unit protects the predetermined storage unit from a write operation, and
    wherein the predetermined storage unit is an electrically rewritable nonvolatile memory.

2. The semiconductor device according to claim 1, wherein the clock signal regulates a rate of the external communication.

3. The semiconductor device according to claim 1, wherein the exclusive control unit includes:
    a memory controller that performs memory interface control on the predetermined storage unit in response to an access request,
    wherein the detection circuit is configured to:
        allow the memory controller to perform a memory interface operation when stoppage of oscillation of the communication oscillator is detected, and
        restrict the memory controller from performing the memory interface operation by the access restriction when oscillation of the communication oscillator is detected.

4. The semiconductor device according to claim 1, wherein the exclusive control unit includes:
    a memory management unit that has a memory protection function for mapped addresses of the predetermined storage unit,
    wherein the detection circuit is configured to:
        allow the memory management unit to translate an address mapped to the predetermined storage unit when stoppage of oscillation of the communication oscillator is detected, and
        restrict the memory management unit from translating the address mapped to the predetermined storage unit by the access restriction when oscillation of the communication oscillator is detected.

5. The semiconductor device according to claim 1, wherein the exclusive control unit is configured to:
    in response to the detection circuit detecting oscillation of the communication oscillator during the read or write operation, suspend the read or write operation and issue an error signal corresponding to the suspended read or write operation.

6. The semiconductor device according to claim 1, comprising a main oscillator that generates a reference clock signal and is different from the communication oscillator.

7. A semiconductor device comprising:
    a communication unit configured for external communication;

a communication oscillator that generates a clock signal used by the communication unit in performing the external communication;
a central processing unit;
a predetermined storage unit; and
an exclusive control unit that exclusively controls communication by the communication unit and access to the predetermined storage unit,
wherein the exclusive control unit includes a detection circuit that detects an oscillation state of the communication oscillator via said clock signal,
wherein the central processing unit is configured to send a signal to the communication oscillator to stop oscillation thereof prior to sending an instruction to perform a read or write operation on the predetermined storage unit,
wherein the exclusive control unit is configured to:
  restrict access to the predetermined storage unit in response to the detection circuit detecting oscillation of the communication oscillator, and
  allow access to the predetermined storage unit only when the detection circuit detects that the communication oscillator is not oscillating after the central processing unit sends said signal to stop oscillation,
wherein the access restriction on the predetermined storage unit by the exclusive control unit protects the predetermined storage unit from a read operation, and
wherein the predetermined storage unit is an electrically rewritable nonvolatile memory.

8. The semiconductor device according to claim 7, wherein the clock signal regulates a rate of the external communication.

9. The semiconductor device according to claim 7, wherein the exclusive control unit includes:
a memory controller that performs memory interface control on the predetermined storage unit in response to an access request,
wherein the detection circuit is configured to:
  allow the memory controller to perform a memory interface operation when stoppage of oscillation of the communication oscillator is detected, and
  restrict the memory controller from performing the memory interface operation by the access restriction when oscillation of the communication oscillator is detected.

10. The semiconductor device according to claim 7, wherein the exclusive control unit includes:
a memory management unit that has a memory protection function for mapped addresses of the predetermined storage unit,
wherein the detection circuit is configured to:
  allow the memory management unit to translate an address mapped to the predetermined storage unit when stoppage of oscillation of the communication clock is detected, and
  restrict the memory management unit from translating the address mapped to the predetermined storage unit by the access restriction when oscillation of the communication oscillator is detected.

11. The semiconductor device according to claim 7, wherein the exclusive control unit is configured to:
in response to the detection circuit detecting oscillation of the communication oscillator during the read or write operation, suspend the read or write operation and issue an error signal corresponding to the suspended read or write operation.

12. The semiconductor device according to claim 7, comprising a main oscillator that generates a reference clock signal and is different from the communication oscillator.

13. An access restriction method for exclusive control of communication by a communication unit and access to a predetermined storage unit, the method comprising:
generating a clock signal by a communication oscillator, the clock signal being used by the communication unit in performing external communication;
sending, by a central processing unit, a signal to the communication oscillator to stop oscillation thereof prior to sending an instruction to perform a read or write operation on the predetermined storage unit;
detecting, by a detection circuit, oscillation of the communication oscillator via said clock signal;
restricting access to the predetermined storage unit in response to oscillation of the communication oscillator being detected by the detection circuit; and
after the central processing unit sends said signal to stop oscillation, removing the access restriction on the predetermined storage unit only when the detection circuit detects that the communication oscillator is not oscillating,
wherein the predetermined storage unit is protected from a read operation by the access restriction while the communication oscillator is oscillating, and wherein a read operation on the predetermined storage unit is allowed while the communication oscillator is not oscillating, and
wherein the predetermined storage unit is an electrically rewritable nonvolatile memory.

14. The access restriction method according to claim 13, comprising:
downloading data from the communication unit into a temporary storage unit while the predetermined storage unit is protected from a write operation by the access restriction, and
writing the data to the predetermined storage unit after the write protection on the predetermined storage unit is removed.

15. The access restriction method according to claim 13, comprising:
enabling a memory controller, which performs memory interface control on the predetermined storage unit in response to an access request, to perform memory interface operations when stoppage of oscillation of the communication oscillator is detected, and
preventing the memory controller from performing memory interface operations by the access restriction when oscillation of the communication oscillator is detected.

16. The access restriction method according to claim 13, comprising:
allowing a memory management unit, which has a memory protection function for mapped addresses of the predetermined storage unit, to translate an address mapped to the predetermined storage unit when stoppage of oscillation of the communication oscillator is detected, and
preventing the memory management unit from translating the address mapped to the predetermined storage unit by the access restriction when oscillation of the communication oscillator is detected.

17. The access restriction method according to claim 13, comprising:
in response to detecting oscillation of the communication oscillator during the read or write operation, suspending the read or write operation and generating an error corresponding to the suspended read or write operation.

18. The access restriction method according to claim 13, wherein the communication oscillator is different from a main oscillator that generates a reference clock signal.

* * * * *